Figure 1:
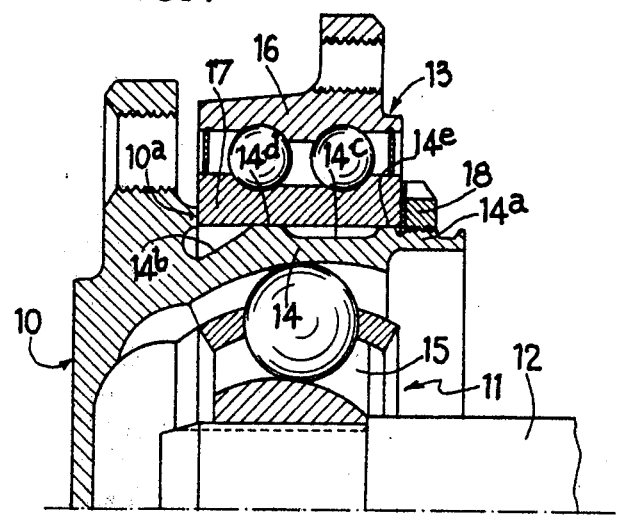

United States Patent [19]

Guimbretierè

[11] 4,417,643

[45] Nov. 29, 1983

[54] WHEEL HUB ASSEMBLY FOR AN AUTOMOBILE VEHICLE

[75] Inventor: Pierre Guimbretierè, Neauphle le Chateau, France

[73] Assignee: Glaenzer Spicer, Poissy, France

[21] Appl. No.: 294,354

[22] Filed: Aug. 19, 1981

[30] Foreign Application Priority Data

Sep. 8, 1980 [FR] France ............................... 80 19336

[51] Int. Cl.³ ............................................ B60K 17/32
[52] U.S. Cl. .................................. 180/254; 180/259; 180/73 R; 464/181
[58] Field of Search ............... 180/259, 258, 254, 256, 180/257, 70 R, 73 D, 73 R; 464/145, 141, 906 R

[56] References Cited

U.S. PATENT DOCUMENTS

| | | | |
|---|---|---|---|
| 4,090,751 | 5/1978 | Krude | 464/145 |
| 4,275,799 | 6/1981 | Guimbretiere | 180/258 |
| 4,359,128 | 11/1982 | Krude | 180/70 R |

*Primary Examiner*—John A. Pekar
*Attorney, Agent, or Firm*—Wenderoth, Lind & Ponack

[57] ABSTRACT

This wheel hub assembly is intended for the driving set of wheels of a vehicle which may be steering wheels or otherwise. It comprises mainly a wheel flange, a transmission joint and a rolling bearing. The axial bearing surface between the flange and the inner race of the rolling bearing is limited to an annular ring of small radial dimension but of relatively large diameter. The section of the passage of the flow of heat between the flange and the race is thus substantially reduced.

16 Claims, 8 Drawing Figures

WHEEL HUB ASSEMBLY FOR AN AUTOMOBILE VEHICLE

DESCRIPTION

The present invention relates to wheel hub assemblies employed on vehicles having front-wheel or rear-wheel drives and an independent suspension, said assemblies being of the type comprising a wheel flange, a rolling bearing including an inner race in contact with the flange and an outer race between which the rolling elements are disposed, and a transmission joint which is disposed radially inside the rolling bearing and has its outer element rigid with the flange and the inner race of the rolling bearing.

It is known that in vehicles having driving wheels with an independent suspension, the wheel hub assembly must include a wheel flange proper, a rolling bearing and a transmission joint. In order to reduce as far as possible the angle of operation of the joint without excessively increasing the width of the vehicle, it is advantageous to dispose the joint radially within the rolling bearing. In such an assembly, it is conventional to employ a single member which constitutes a wheel flange, the inner race of the rolling bearing and the outer element of the transmission joint. The use of a such a member performing several functions results in several drawbacks:

as this member is in a single piece and made from a material which is capable of satisfying the requirements of the rolling bearing function, it is therefore made from a high-quality material which is consequently expensive;

this main member is difficult to manufacture in mass production since it is heavy and has moreover a very asymmetrical shape; moreover, it has many high precision dimensions with consequently a high rejection risk; lastly, it requires machining operations, such as tapping, which jeopardize its reliability;

the heat generated by the use of the brake is transmitted to the whole of the member, and in particular to the parts thereof adjacent the flange constituted by the inner race of the rolling bearing and by the outer element of the transmission joint and this disturbs the correct operation of these two components (rolling bearing and joint) and the corresponding sealing elements.

An object of the invention is to provide a wheel hub assembly which avoids in particular the various aforementioned drawbacks.

The invention consequently provides a wheel hub assembly of the aforementioned type, wherein the wheel flange and the inner race of the rolling bearing are formed by two distinct members, the axial bearing contact between the two members being limited to an annular ring of reduced radial dimension and the axial surface of contact between the outer element of the joint and the inner race of the rolling bearing also being reduced.

According to other features of the invention which still further reduce the flow of heat transmitted on the flange: a washer is provided between the wheel flange and the inner race of the rolling bearing, which washer is of a material having heat insulating properties, it being possible to arrange that this washer form a deflector between the flange and the inner race of the rolling bearing; the section of the passage of the flow of heat between the flange and the outer element of the joint is reduced.

Figure 3:
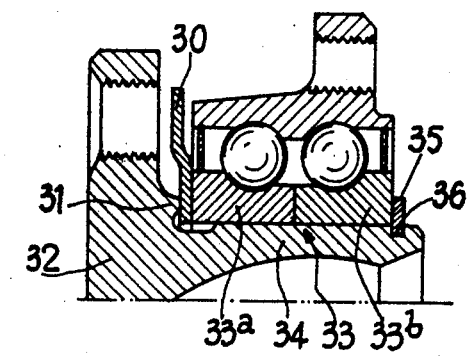
Figure 4:
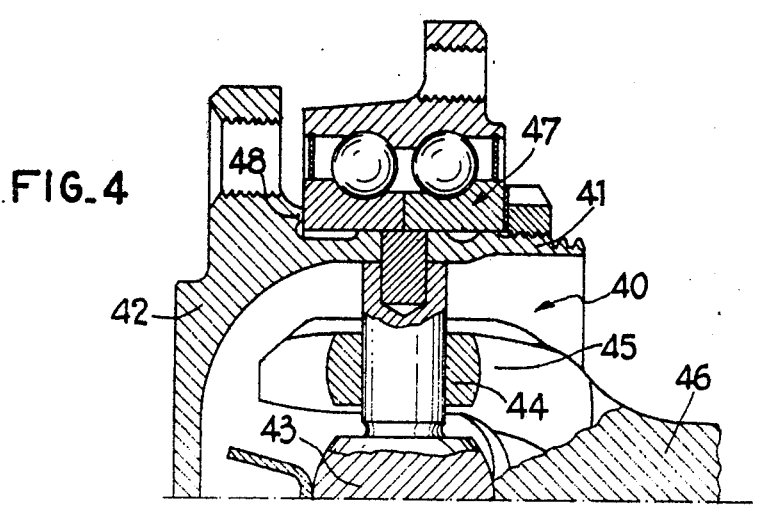
Figure 5:
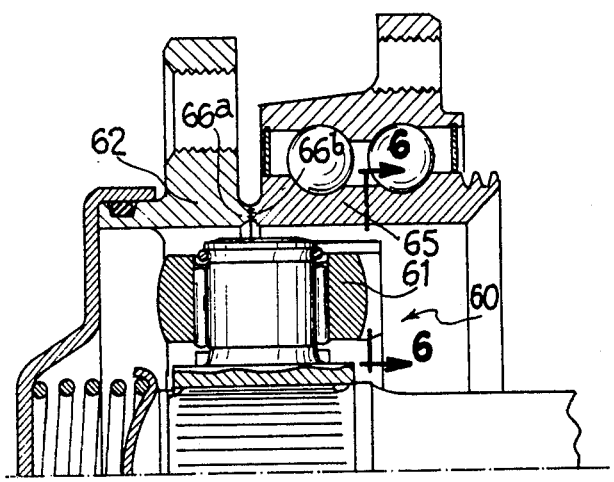
Figure 6:
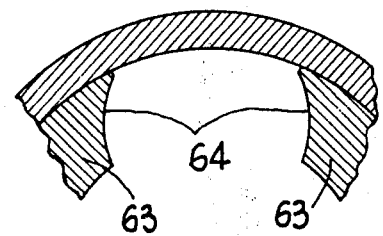

Various embodiments of the invention may be envisaged, a certain number of which will be described hereinafter with reference to the accompanying drawings which are given solely by way of examples and in which:

FIGS. 1 to 5 and FIGS. 7 and 8 are partial axial sectional views of various embodiments of the invention, and FIG. 6 is a partial sectional view taken on line 6—6 of FIG. 5.

FIG. 1 shows a wheel assembly for an automobile vehicle driving set of wheels having an independent suspension. This assembly mainly comprises three sub-assemblies, namely a wheel flange 10, a transmission joint 11 ensuring the connection at a variable angle between the wheel flange and a transmission shaft 12, and a rolling bearing 13 which supports the wheel with respect to the structure of the vehicle.

The wheel flange is in one piece with an outer element or bell element 14 of the transmission joint which, in the presently described embodiment, is of the type including balls, which is also termed a "RZEPPA joint". The inner element 15 of the joint is connected to rotate with the transmission shaft and the angular position between the inner and outer elements may vary while maintaining the homokinetic character of the transmission.

The rolling bearing comprises an outer race 16 adapted to be fixed to a hub support and an inner race 17, rolling elements being disposed in the known manner between the two races.

The wheel flange has on the side thereof facing the rolling bearing a projecting annular ring 10a whose end surface in contact with the race 17 has a relatively small radial dimension, for example of the order of 1 to 2 mm. The assembly between the inner race 17 of the rolling bearing and the wheel flange is achieved in this embodiment by means of a nut 18 which cooperates with a screwthreaded portion 14a of the bell element 14. This bell element has recesses 14b, 14c on the periphery thereof so that the area of axial contact between this outer bell element and the inner race of the rolling bearing is limited to two cylindrical bearing surfaces 14d, 14e of small axial length. Further, the recess 14d reduces the section of the passage of the flow of heat between the flange and the bell element 14.

Figure 2:
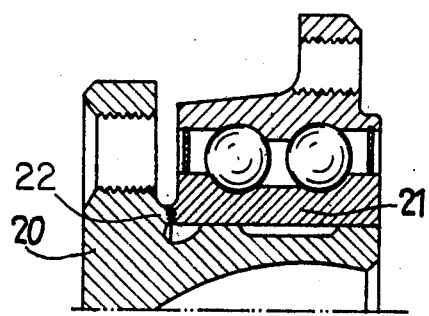

FIG. 2 shows a modification in which a wheel flange 20 and an inner ring 21 of the rolling bearing are rendered rigid with each other by a weld along the support ring 22. The weld may be produced by any suitable method such as electronic bombarding, laser, friction welding etc. The other elements of the assembly which are identical to those of FIG. 1 have not been described in detail.

In the embodiment shown in FIG. 3, a washer 30 of insulating material, for example based on asbestos, is interposed between the ring 31 of the flange 32 and the inner bearing race 33 which is here made in two juxtaposed parts 33a, 33b. Preferably, the insulating washer extends radially substantially beyond the ring 31 so as to constitute a deflector between the wheel flange and the bearing. The assembly between this composite inner ring and the member defining the flange 32 and the outer bell element 34 of the transmission joint is here achieved by means of a ring 35 received in a groove 36.

In the embodiment shown in FIG. 4, the transmission joint employed is a joint 40 of the tripod type whose outer element 41, which is in one piece with the wheel flange 42, constitutes a bowl element with which the tripod element 43 is rigid. This tripod element has, rotatively and slidably mounted thereon, three rollers 44 of spherical shape which are received in tracks 45 of part-circular section defined in an element 46 in the shape of a tulip connected to a transmission shaft. The inner race 47 of the rolling bearing is here again, made in two parts and there is found in the region of axial and radial contact between the inner race of the bearing and the member defining the wheel flange and the outer bowl element of the joint, the same general arrangement as in the embodiment of FIG. 1, and in particular a support ring 48 of small radial dimension. The same is true as concerns the assembly between these various elements.

The wheel hub assembly represented in FIGS. 5 and 6 is provided for application to a non-steering driving wheel which result in certain features of the transmission joint 60, which preferably allows a certain amount of axial sliding. This joint may be of the type having rollers 61, namely two rollers if it concerns a bipod, non-homokinetic joint, three rollers if it concerns a tripod homokinetic joint. FIGS. 5 and 6 show that the wheel flange 62 has an axial extension 63 in which are formed recesses constituting tracks 64 for the rollers (FIG. 6), this axial extension being received within the inner race of the rolling bearing 65. The connection between this inner race and the wheel flange is, for example, achieved by a weld along the ring 66a, 66b, as in the embodiment of FIG. 2. In this modification, there are in fact provided on the wheel flange and the inner race of the bearing two rings 66a, 66b which are in contact by their end surfaces. By way of a modification, the ring may be provided entirely on the bearing race.

Figure 7:
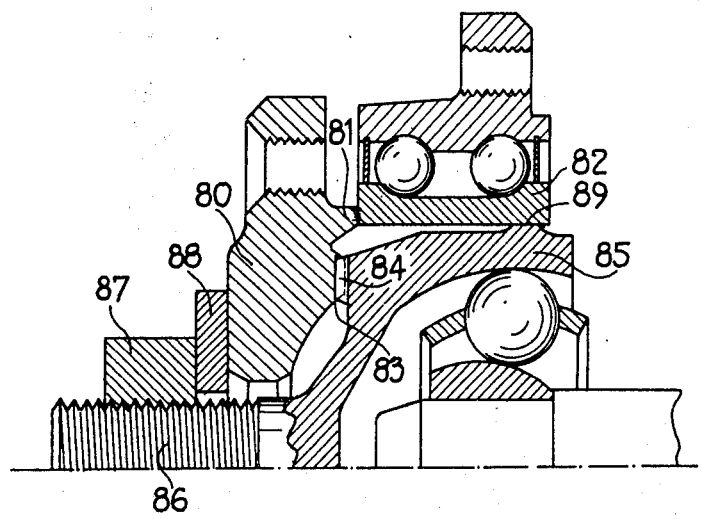

The arrangement shown in FIG. 7 is a wheel flange 80 including on the inner surface thereof, on one hand, a ring 81 bearing against the inner race 82 of the bearing, and, on the other hand, front splines 83 which cooperate with complementary splines 84 provided on the outer element 85 of the transmission joint. This outer element includes a screwthreaded axial spigot 86 which extends through an opening in the flange and by which it is rendered rigid with this flange by means of a nut 87 and a washer 88. The axial surface of contact between this outer element 85 and the inner race 82 of the bearing is limited to a short cylindrical bearing surface 89.

The joint employed in this embodiment is a joint having balls, such as that described briefly with reference to FIG. 1 so that it is unnecessary to describe it again.

Figure 8:
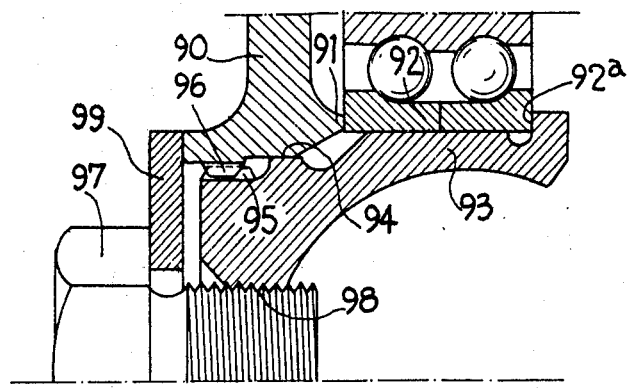

In the embodiment shown in FIG. 8, the wheel flange 90 again has an annular ring 91 which bears against the inner race 92 of the rolling bearing which is in two parts and which bears by the opposite end thereof against a radial bearing surface 92a provided on the element 93 of the articulation joint which may be of any suitable type. This element further comprises a cylindrical bearing surface 94 for centering it with respect to the flange and axial splines 95 cooperating with complementary splines 96 provided on the wheel flange. The various component elements are assembled by means of a bolt 97 which cooperates with a tapped aperture 98 in the outer element of the articulation joint and a washer 99 which is interposed between the bolt and the wheel flange.

In the various illustrated embodiments, an essential feature resides in the fact that the radial bearing surface between the wheel flange and the adjacent inner race of the rolling bearing is limited to a ring of small radial dimension, for example 1 to 2 mm, but of relatively large diameter, bearing in mind that the transmission joint is located within this inner race of the rolling bearing. The mean diameter of this ring may be, for example, of the order of 80 mm, which provides a surface of contact between the flange and the inner race of between about 250 and 500 sq.mm. This surface of contact is quite sufficient whether it concerns shear stress or bending stress. Moreover, it is employed under very favourable conditions bearing in mind its large diameter, which improves the seating and the distribution of the bearing force between the two elements. This small surface of contact very considerably reduces the transmission of heat between the wheel flange and the adjacent race of the bearing, this transmission of heat being still further reduced if there is interposed between the two elements an insulator, as shown in FIG. 3.

An arrangement such as that described in various variants affords many advantages over the prior art. Indeed:

the nature of the materials employed may correspond for each of the component parts to the requirements of each of the functions fulfilled so that it is possible to employ for some of these parts, lower-quality and consequently cheaper materials;

the component parts may be produced with normal means of production without raising special technical problems;

as mentioned before, the flow of heat between the various component parts is better controlled;

if the rolling bearing has a single inner race, it may however be symmetrically pre-assembled and consequently have larger dimensions;

if the rolling bearing has two inner races, it is still easier to dimension and produce.

Note moreover that all these advantages are not obtained to the detriment of other features which, of course, still further stresses the interest of this invention.

Having now described my invention, what I claim as new and desire to secure by Letters Patent is:

1. A wheel hub assembly comprising a wheel flange, a rolling bearing comprising an inner race in contact with the flange, an outer race, and rolling elements interposed between said races, and a transmission joint disposed radially inside the rolling bearing and having an outer element which is connected to rotate with the flange and with the inner race of the bearing, the wheel flange and the inner race of the bearing being formed by two distinct members, an axial connection between axially adjacent end surfaces of said two members being limited to a ring portion which is on at least one of said two members, has a radial extent of less than the radial extent of said adjacent end surface of said inner race of the bearing and is located adjacent the radially outer periphery of the inner race and an axially-extending surface of contact between the outer element of the joint and the inner race of the bearing, said surface of contact being interrupted by at least one empty recess in the outer element of the joint.

2. An assembly according to claim 1, wherein said axial surface is reduced by providing recesses on the periphery of said outer element.

3. An assembly according to claim 1, wherein said ring portion has a radial dimension of the order of 1 to 2 mm and a diameter of the order of 80 mm.

4. An assembly according to claim 1, comprising a washer made from a material having heat insulating properties and interposed between said axially adjacent end surfaces of the wheel flange and the inner race of the rolling bearing.

5. An assembly according to claim 4, wherein said insulating washer extends radially outwardly beyond said ring portion and said inner race so as to constitute a deflector between the flange and the rolling bearing.

6. An assembly according to any one of the claims 1 to 5, wherein the outer element of the joint constitutes a single piece with the flange and an annular recess located between the flange and the outer element and formed in said single piece reduces the cross-sectional size of said piece and consequently the section of the passage of flow of heat between the flange and the outer element of the joint.

7. An assembly according to any one of the claims 1 to 5, wherein the wheel flange is in one piece with the outer element of the transmission joint.

8. An assembly according to any one of the claims 1 to 5, wherein the wheel flange and the inner race of the rolling bearing are rigidly fixed together by a weld along said ring portion.

9. An assembly according to any one of the claims 1 to 5, wherein the inner race of the rolling bearing is maintained by a screwthreaded connection between a nut and a screwthreaded portion of the outer element of the joint.

10. An assembly according to any one of the claims 1 to 5, wherein the inner race of the rolling bearing is maintained by an elastically yieldable ring received in a groove in the outer element of the joint.

11. An assembly according to any one of the claims 1 to 5, wherein the wheel flange, the outer element of the joint and the inner race of the rolling bearing are three distinct members.

12. An assembly according to claim 11, comprising a coupling including confronting interengaging teeth provided on the wheel flange and on the outer element of the joint.

13. An assembly according to claim 11, comprising a coupling including axial splines between the wheel flange and the outer element of the joint.

14. An assembly according to claim 11, wherein the wheel flange and the outer element of the joint are assembled by a screwthreaded connection by means of a screwthreaded element which cooperates with a complementary screwthreaded portion of said outer element.

15. An assembly according to claim 11, wherein the outer element of the joint comprises a radially-extending shoulder against which radially-extending shoulder the inner race of the rolling bearing bears.

16. An assembly according to claim 1, wherein said radial extent of said ring portion is less than half the radial extent of said adjacent end surface of the inner race of the bearing.

* * * * *